United States Patent

[11] 3,582,955

[72] Inventors James A. McMurray
Metedeconk;
John T. Walsh, Highlands, both of, N.J.
[21] Appl. No. 868,958
[22] Filed Sept. 24, 1969
[45] Patented June 1, 1971

[54] OSCILLOSCOPE DISPLAY FOR PLOTTING DEVICE
1 Claim, 1 Drawing Fig.

[52] U.S. Cl. .......... 346/17
[51] Int. Cl. .......... G01d 7/10
[50] Field of Search .......... 346/17, 29; 172.5 (Inquired); 165

[56] References Cited
UNITED STATES PATENTS
3,098,219 7/1963 Voigt et al. .......... 340/165X
3,278,926 10/1966 Wiley et al. .......... 340/347

*Primary Examiner*—Joseph W. Hartary
*Attorneys*—Edward A. Petko and Robert M. Skolnik

ABSTRACT: The specification describes an oscilloscope display for binary signals being plotted on a mechanical plotting device. A control circuit for the oscilloscope is disclosed which blanks the oscilloscope beam if either the pen of the mechanical plotting device is up or if the device is not plotting.

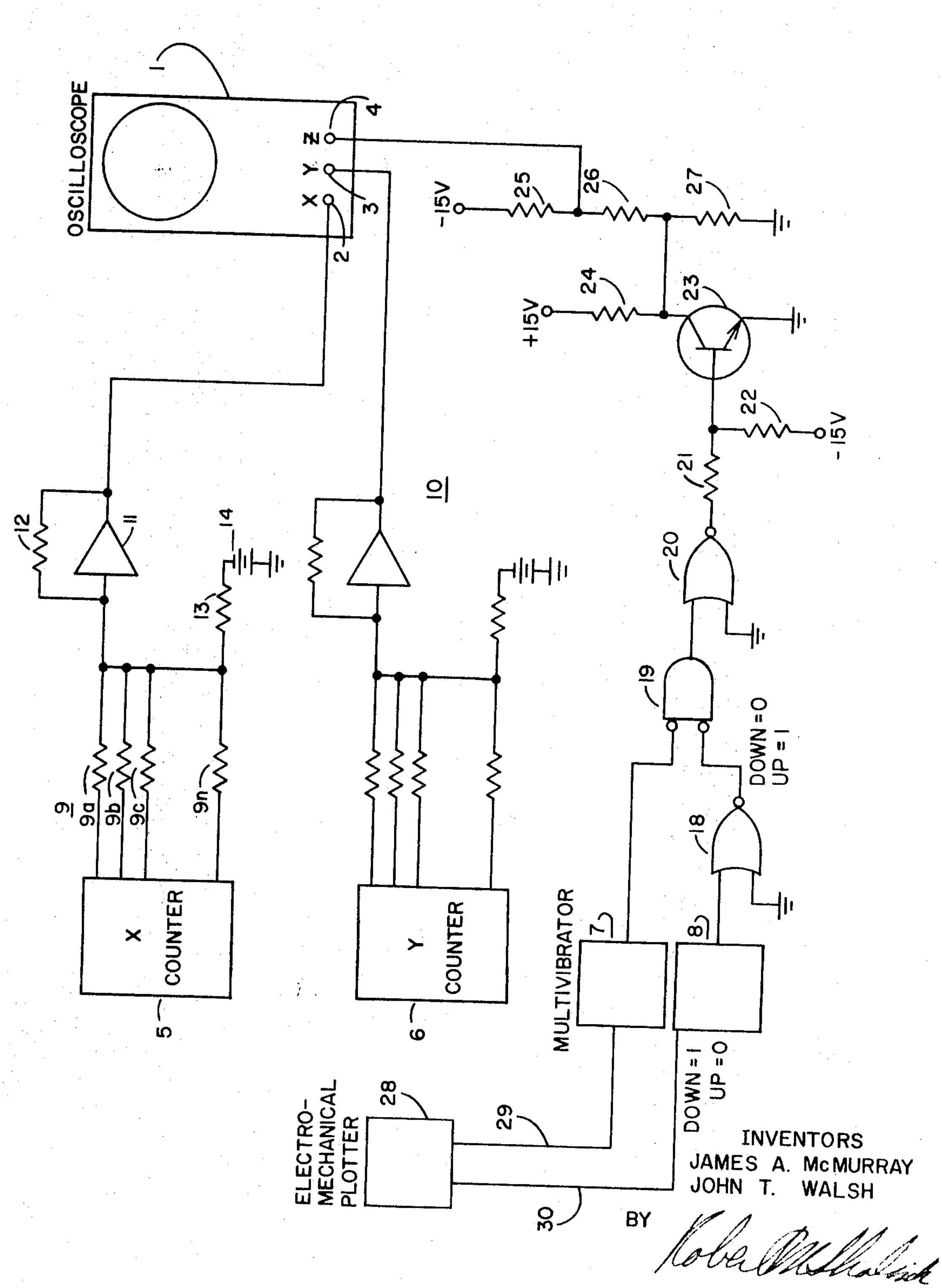
INVENTORS
JAMES A. McMURRAY
JOHN T. WALSH
BY

OSCILLOSCOPE DISPLAY FOR PLOTTING DEVICE

This invention relates to display systems employing oscilloscopes for displaying digital signals.

The advent of the high-speed general purpose digital computer has brought forth the need for a class of devices for presenting the computer-generated output data in a form suitable for ready interpretation by human beings. Toward this end, a variety of systems for display of the output of a digital computer are now being marketed. These systems have been classified as: (a) alphanumeric displays; and (b) graphic displays; and (c) large screen displays. As the name implies, alphanumeric displays are capable of displaying only alphanumeric data and are usually employed as communications terminal devices to provide interaction between a computer and an operator. Graphic displays provide line drawings in addition to presenting data in alphanumerics form. Large screen displays have generally been custom built for use by large audiences.

Within the above three classifications, a further breakdown between passive and interactive devices has been used. The passive device provides a display strictly for operator viewing. Interactive devices permit the operator to control the digital computer by manipulation of the controls provided for this purpose.

The present invention provides a passive graphic output device for use wherever it is desired to provide a direct display of the output of a computer.

The present invention is particularly adapted for use with mechanical graphical output devices such as flat bed or drum-type plotters. A typical example of such a plotter is found in U.S. Pat. No. 3,199,111 to Jennings et al.

As is well known, there is a significant differential in speed between the data output rate from a digital computer and the ability of a mechanical plotter to respond to that data. The present invention provides a direct display of the output of a computer with a response time much faster than that of the mechanical plotter. With the plotter connected to receive data, the present invention provides a full display of the data *before* the data is plotted. In other words, a "quick look" at the output data is provided without the necessity of waiting until the plotter has completed its operations.

The invention utilizes a commercially available high persistence storage oscilloscope such as that manufactured by Tektronix, Inc., Beaverton, Oregon, under their Model No. 611. This oscilloscope provides X, Y and Z (Intensity) inputs. The digital data from the computer which is being fed to the plotter is also stored in respective X and Y counters and is converted to analog form by digital-to-analog converters connected to the counters. The analog signals thus generated are directly connected to the X and Y inputs of the oscilloscope.

The pen up-down control signal for the plotter is used as the control for the Z or intensity input of the oscilloscope. In order to avoid burning of the face of the cathode-ray tube, the pen up-down signal is gated with a clock so that intensity is diminished after a predetermined number of clock periods if no pen-up signal is received.

A principal object of the invention is the provision of a passive graphic display terminal for a digital computer.

Another object of the invention resides in a display terminal for use where a mechanical graphical plotter is employed as the output readout device for a computer.

A further object of the present invention resides in the provision of a device for displaying a computer output to be plotted on a mechanical plotter before the plotter has completed the plot.

These as well as further objects and advantages of the invention will be apparent to those skilled in the art from the following specification reference being had to the accompanying drawings in which:

The single FIGURE is partial schematic and partial block diagram of the invention.

In the FIGURE reference numeral 1 denotes a high persistence storage oscilloscope such as the Tektronix Model 611. This oscilloscope has input terminals 2, 3, 4 for the X, Y and Z (intensity) axes respectively.

It is assumed that the digital computer output data is being plotted on a mechanical plotter of the type disclosed in the aforementioned Jennings et al. patent. The digital data to be plotted is stored in counters 5 and 6. Counter 5 provides storage for the X component of the data while counter 6 stores the Y component thereof. It will be understood that counters 5 and 6 may be already located in the electronics portion of the mechanical plotter or may be added thereto in order to practice the present invention.

Counters 5 and 6 provide parallel outputs to respective digital-to-analog converters shown generally at 9 and 10. Converter 9 has a number of resistors *9a*, *9b*, *9c* . . . *9n*, connected to receive respective bit position outputs from counter 5. The number of resistors 9 required is the same as the number of bit positions stored in the counter. Resistors 9 have different values weighted in accordance with the binary scale as is well known in the digital-to-analog conversion art. The output of resistors 9 is summed and connected to the input of amplifier 11. The series connection of voltage source 14 and resistor 13 is also connected to the input of amplifier 11 and provides a voltage reference level for the converter. Feedback resistor 12 with the input resistors 9 provides gain adjustment for amplifier 11. The analog signal thus generated is directly connected to the X input 2 of oscilloscope 1.

Similar structure and operation is provided in digital-to-analog converter 10 for the Y component of the data stored in counter 6. The analog signal developed by converter 10 is applied to the Y input 3 of the oscilloscope.

Intensity control for the oscilloscope is provided by the pen up-down signal shown generally at reference numeral 8. This signal may be generated in a variety of ways in different mechanical plotters. In the aforementioned Jennings et al. patent, the pen Up-down signal is provided by an instruction code. In another mechanical plotting device for digital data manufactured by the assignee of the present invention designated as model number 430, the pen up-down signal is also generated by an appropriate instruction code. Thus, reference number 8 represents one of any number of sources of the pen up-down control signal on a mechanical plotting device.

The pen up-down signal is connected to one input of a logical NOR gate 18. The other input to NOR gate 18 is grounded. Gate 18 is of the type having an inverting output denoted in the figure by the circle appearing at the output of the gate. Grounding of one input of gate 18 results in the gate functioning as an inverter. The output of NOR gate 18 is in turn, connected to one input of an AND gate 19. The generation of the other input to AND gate 19 will now be described.

A signal is produced by multivibrator 7 for application to AND gate 19. The output of the multivibrator is a logic level ZERO if the mechanical plotting device is plotting and is logic level ONE if the plotting device is not plotting.

The portion of the oscilloscope intensity control circuit thus far described operates in the following manner. NOR gate 18 produces an output logic level ONE when the pen up-down signal is level ZERO (pen-up), and a logic level ZERO when the pen up-down signal is at level ONE (pen-down). AND gate 19 produces a level ONE output whenever both the pen is down and the device is plotting. Gate 19 is inhibited if either the plotting is terminated or the pen is up.

Gate 19 produces an output of logic level ONE if both of its inputs are at level ZERO. NOR gate 20 functions as an inverter resulting in a logic level ZERO applied to resistor 21. Resistor 21 is the base-driving resistor for electronic switching circuit comprised of transistor 23, bias resistor 22, and load resistor 24. The switch controls the potential level at the junction of resistors 26 and 27 which, with resistor 25, constitute a voltage divider. More particularly, a logic level ONE output from NOR gate 20 turns transistor 23 on thus placing the collector element of the transistor at virtually ground potential. The junction of resistors 26 and 27 tracks the collector and the resultant potential at the junction of resistors 25 and 26 blanks or turns off the beam of the CRT.

If the output of NOR gate 20 is logic level ZERO, transistor 23 is nonconducting. The junction between resistors 26 and 27 is thus at a high potential controlled by the sense connection of a +15 voltage source and resistor 24 as well as resistor 27. The voltage at the junction of resistors 25 and 26 is now of such a magnitude and polarity that the oscilloscope beam is unblanked or turned on.

Should the plotting operation stop for any reason with the pen up-down signal commanding the pen down, multivibrator 7, which only produces an output when actual plotting is being accomplished, will stop. This results in outputs of logic level ZERO at gate 18 and ONE at the output of multivibrator 7. AND gate 19 produces an output of level ZERO which turns transistor 23 on, blanking the oscilloscope.

In the FIGURE, numeral 28 denotes an electromechanical plotting device such as that described in the aforementioned patent to Jennings et al. The plotter provides output signals for the oscilloscope intensity control circuit via leads 29 and 30. Lead 29 provides a control signal to multivibrator 7 if the mechanical plotting device is plotting while lead 30 provides the pen up-down signal.

We claim:

1. In combination:

an electromechanical plotting device having pen up-down control means;

an oscilloscope having vertical, horizontal, and electron beam intensity control inputs;

means in said plotting device connected to said vertical control input for producing a vertical control signal;

means in said plotting device connected to said horizontal control input for producing a horizontal control signal; and means connected to said plotting device and to said intensity control input for producing an electron beam intensity control signal;

the improvement in said intensity control signal producing means comprising:

multivibrator means connected to said plotting device for producing a first output signal having a first stable state if said device is plotting and a second stable state if said device is not plotting;

means connected to said plotting device for producing a second output signal having a first level if said pen control means is in the up position and a second level if said pen control means is down;

a logical AND gate connected to said multivibrator means and to said second signal producing means for producing a third output signal if said first output signal is in said first stable state and said second output signal is at said second level, a voltage divider network connected to said electron beam intensity control input;

electronic switch means connected to said voltage divider and said AND gate to control the voltage output of said voltage divider as a function of said third output signal and thereby the intensity of said electron beam.